(12) United States Patent
Jain et al.

(10) Patent No.: US 10,405,384 B2
(45) Date of Patent: Sep. 3, 2019

(54) DRIVING CIRCUIT USING BUCK CONVERTER CAPABLE OF GENERATING SUFFICIENT VOLTAGE TO POWER A LED CIRCUIT AND ASSOCIATED AUXILIARY CIRCUITRY IN A NORMAL MODE OF OPERATION, AND INSUFFICIENT TO POWER THE LED CIRCUIT BUT SUFFICIENT TO POWER THE ASSOCIATED AUXILIARY CIRCUITRY IN AN OFF MODE OF OPERATION

(71) Applicant: STMicroelectronics International N.V., Schiphol (NL)

(72) Inventors: Akshat Jain, Nahan (IN); Ranajay Mallik, Ghaziabad (IN)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 16/106,593

(22) Filed: Aug. 21, 2018

(65) Prior Publication Data
US 2019/0059135 A1  Feb. 21, 2019

Related U.S. Application Data

(60) Provisional application No. 62/548,203, filed on Aug. 21, 2017.

(51) Int. Cl.
*H05B 33/08* (2006.01)
*H02M 3/15* (2006.01)
(Continued)

(52) U.S. Cl.
CPC .......... *H05B 33/0815* (2013.01); *H02M 1/08* (2013.01); *H02M 3/156* (2013.01);
(Continued)

(58) Field of Classification Search
CPC .......... H02M 1/32; H02M 2001/0006; H02M 2001/0032; H02M 3/33592; H02M 1/08;
(Continued)

(56) References Cited

U.S. PATENT DOCUMENTS 8,786,266 B2 * 7/2014 Deval .................. H02M 3/158
                                                                323/282
8,836,165 B2 * 9/2014 Wei ........................ H02M 1/10
                                                                307/77

(Continued)

OTHER PUBLICATIONS

"Zener Voltage Regulators," 800 mW SOD-323FL Surface Mount, NZ3FxxxT1G Series, SZNZ3FxxxT1G Series, On Semiconductor, www.onsemi.com, Publication Order No. NZ3F2V4T1/D, Jun. 2016, 3 pages.

(Continued)

*Primary Examiner* — Vibol Tan
(74) *Attorney, Agent, or Firm* — Crowe & Dunlevy

(57) ABSTRACT

A circuit includes a voltage converter converting source voltage to supply voltage at a first node as a function of a feedback voltage at a feedback node. A first output path is coupled between first and second node nodes. Feedback circuitry couples the second node to the feedback node when a voltage at the second node exceeds a first overvoltage, in a first mode of operation. The feedback circuitry couples the second node to the feedback node when the voltage at the second node exceeds a second overvoltage less than the first overvoltage, in a second mode of operation. Impedance circuitry is coupled between the first node and a third node and generates an auxiliary supply voltage and an auxiliary ground voltage when the circuit is in both the first and second modes, the auxiliary supply voltage being less than the supply voltage in both the first and second modes.

30 Claims, 4 Drawing Sheets

(51) Int. Cl.
   *H02M 1/08* (2006.01)
   *H02M 3/156* (2006.01)
   *H02M 1/00* (2006.01)

(52) U.S. Cl.
   CPC ..... *H05B 33/0809* (2013.01); *H05B 33/0851* (2013.01); *H02M 2001/0006* (2013.01); *H02M 2001/0025* (2013.01); *H02M 2001/0032* (2013.01)

(58) Field of Classification Search
   CPC ..... H02M 2001/0009; H02M 3/33507; H02M 1/36; H02J 1/102; H02J 9/005; H05B 33/0815; H05B 33/0809; H05B 33/0812; H05B 33/0851
   See application file for complete search history.

(56) References Cited

U.S. PATENT DOCUMENTS

| | | | | |
|---|---|---|---|---|
| 8,933,641 B2* | 1/2015 | De Anna | .................. | H02M 3/07 315/149 |
| 9,537,407 B2* | 1/2017 | Fang | .................. | H02M 3/33523 |
| 9,742,295 B2* | 8/2017 | Chen | .................. | H02M 3/33523 |
| 9,859,812 B2* | 1/2018 | Siessegger | .......... | H05B 33/0806 |
| 9,966,848 B2* | 5/2018 | Avrutsky | ............... | H02M 3/158 |
| 10,075,084 B2* | 9/2018 | Kikuchi | .................. | H02M 1/32 |
| 2012/0187869 A1* | 7/2012 | Angelin | ............ | H02M 3/33523 315/307 |
| 2018/0177010 A1* | 6/2018 | Liu | .................. | H02M 3/33523 |

OTHER PUBLICATIONS

Condit, Reston: "Transformerless Power Supplies: Resistive and Capacitive," Microchip AN954, 2004 Microchip Technology Inc., 14 pages.

Kim, Jin-Tae and Koo, Gwan-Bon: "Designing Auxiliary Power Supplies for High Efficiency and Low Standby Power," Fairchild Semiconductor Power Seminar 2008-2009, 12 pages.

Witherspoon, Bryan: "Voltage Regulation Using Zener Diodes," http://www.egr.msu.edu/classes/ece480/goodman/fall08/group0 . . . , Nov. 8, 2008, 3 pages.

* cited by examiner

DRIVING CIRCUIT USING BUCK CONVERTER CAPABLE OF GENERATING SUFFICIENT VOLTAGE TO POWER A LED CIRCUIT AND ASSOCIATED AUXILIARY CIRCUITRY IN A NORMAL MODE OF OPERATION, AND INSUFFICIENT TO POWER THE LED CIRCUIT BUT SUFFICIENT TO POWER THE ASSOCIATED AUXILIARY CIRCUITRY IN AN OFF MODE OF OPERATION

RELATED APPLICATION

This application claims priority to U.S. Provisional Patent Application No. 62/548,203, filed Aug. 21, 2017, entitled "DRIVING CIRCUIT USING BUCK CONVERTER CAPABLE OF GENERATING SUFFICIENT VOLTAGE TO POWER A LED CIRCUIT AND ASSOCIATED AUXILIARY CIRCUITRY IN A NORMAL MODE OF OPERATION, AND INSUFFICIENT TO POWER THE LED CIRCUIT BUT SUFFICIENT TO POWER THE ASSOCIATED AUXILIARY CIRCUITRY IN AN OFF MODE OF OPERATION", the contents of which are incorporated herein in their entirety.

TECHNICAL FIELD

This disclosure is related to the field of smart lighting systems, and in particular, to a buck converter driving topology for a smart light. This buck converter is low cost and effective by virtue of its use of buck topology, but is still capable of powering both an LED circuit and its associated auxiliary circuitry (e.g. control circuitry and wireless communications circuitry) in a normal mode of operation (light on), and of powering the associated auxiliary circuitry in an off mode of operation (light off).

BACKGROUND

Some smart lighting devices, such as LED smart bulbs, are equipped with wireless modules which act as a transceiver to receive commands, as well as a microcontroller to control operation of the individual LED elements. Typically, the individual LED elements are powered by a main power supply, and the transceiver and microcontroller are powered by a separate auxiliary power supply.

Since there is a great commercial desire for these LED smart bulbs to be relatively low cost, as well as to consume a minimal amount of power, it is necessary to for these power supplies to be capable of keeping power consumption low while also being inexpensive to produce, yet capable of meeting the requirements of the smart light system, such as providing for dimming functionality.

Therefore, development of power supplies capable of meeting these requirements is necessary.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a circuit including a voltage converter configured to convert a source voltage to a supply voltage at a first node as a function of a feedback voltage at a feedback node. A first output path is coupled between the first node and a second node. Feedback circuitry is configured to couple the second node to the feedback node when a voltage at the second node exceeds a first overvoltage when the circuit is in a first mode of operation, and couple the second node to the feedback node when the voltage at the second node exceeds a second overvoltage less than the first overvoltage when the circuit is in a second mode of operation. Impedance circuitry is coupled between the first node and a third node and configured to generate an auxiliary supply voltage and an auxiliary ground voltage when the circuit is in both the first and second modes of operation, the auxiliary supply voltage being less than the supply voltage in both the first and second modes of operation.

The feedback circuitry may include a first zener diode coupled between the second node and a fourth node, a second zener diode coupled between the fourth node and the feedback node, and a switching element configured to short the second zener diode when the circuit is in the second mode of operation, and to not short the second zener diode when the circuit is in the first mode of operation.

The switching element may be a transistor having a first conduction terminal coupled to the feedback node, a second conduction terminal coupled to the fourth node, and a control terminal biased by a mode signal that serves to turn on the transistor when the circuit is in the second mode of operation and to turn off the transistor when the circuit is in the first mode of operation.

The switching element may be a bipolar junction transistor having an emitter coupled to the feedback node, a collector coupled to the fourth node, and a base biased by a mode signal that serves to turn on the bipolar junction transistor when the circuit is in the second mode of operation and to turn off the bipolar junction transistor when the circuit is in the first mode of operation.

The switching element may be a field effect transistor (FET) having a source coupled to the feedback node, a drain coupled to the fourth node, and a gate biased by a mode signal that serves to turn on the FET when the circuit is in the second mode of operation and to turn off the FET when the circuit is in the first mode of operation.

The impedance circuitry may be a second output path coupled between the second node and the third node, with a first inductor coupled between the third node and an auxiliary supply node at which the auxiliary supply voltage is generated, and a second inductor coupled between the auxiliary supply node and an auxiliary ground node at which the auxiliary ground voltage is generated. A filter may be coupled between the auxiliary supply node and the feedback node.

The second output path may be a diode having a cathode coupled to the second node and an anode coupled to a fourth node.

The filter may include a first resistor and a first capacitor coupled in series between the auxiliary supply node and the auxiliary ground, and a second resistor coupled between the auxiliary ground and the feedback node.

A second capacitor may be coupled between the auxiliary ground and the first node.

The first output path may include a second resistor.

The voltage converter may include an error amplifier having inputs coupled to the impedance circuitry and the feedback node, and generating a control signal based thereupon. Regulation circuitry may be configured to generate a switching signal as a function of the control signal from the error amplifier. A power transistor may have a first conduction terminal coupled to the source voltage, a second conduction terminal coupled to the first node, and a control terminal biased by the switching signal.

Coupling of the second node to the feedback node may result in the error amplifier generating the control signal so as to cause the regulation circuitry to generate the switching signal so as to switch the power transistor off, therefore when the circuit is in the first mode of operation, the coupling of the second node to the feedback node by the feedback circuitry when the voltage at the second node exceeds the first overvoltage results in the supply voltage being higher than it would be in the second mode of operation where the feedback circuitry couples the second node to the feedback node when the voltage at the second node exceeds the second overvoltage which is less than the first overvoltage.

A LED chain may be coupled to the third node, be turned on by the supply voltage when the circuit is in the first mode of operation, and not be turned on by the supply voltage when the circuit is in the second mode of operation.

An auxiliary power supply may be coupled to the auxiliary supply voltage and auxiliary ground voltage. A microcontroller may be powered by the auxiliary power supply and configured to generate a LED dimmer control signal to be coupled to the feedback node. A wireless module may be powered by the auxiliary power supply and configured to relay user commands to the microcontroller.

The feedback circuitry may include a first resistor coupled between the second node and the feedback node, a second resistor coupled between the feedback node and a fourth node, a third resistor coupled between the fourth node and the first node, and a switching element configured to not short the third resistor when the circuit is in the second mode of operation, and to short the third resistor when the circuit is in the first mode of operation.

The switching element may be a transistor having a first conduction terminal coupled to the first node, a second conduction terminal coupled to the fourth node, and a control terminal biased by a mode signal that serves to turn off the transistor when the circuit is in the second mode of operation and to turn on the transistor when the circuit is in the first mode of operation.

The switching element may be a bipolar junction transistor having an emitter coupled to the first node, a collector coupled to the fourth node, and a base biased by a mode signal that serves to turn off the bipolar junction transistor when the circuit is in the second mode of operation and to turn on the bipolar junction transistor when the circuit is in the first mode of operation.

The first output path may be a first resistor.

Method aspects are also contemplated herein. One such method aspect may include converting an input voltage to an output voltage using a switching voltage converter circuit, in response to a feedback voltage. In a normal mode of operation, the method may include providing the feedback voltage to the voltage converter circuit at a voltage level sufficient to stop switching of the switching voltage converter circuit if the output voltage exceeds a first overvoltage, and providing the feedback voltage to the voltage converter circuit at a voltage level insufficient to stop switching of the switching voltage converter circuit if the output voltage is less than the first overvoltage. The method may also include powering a LED circuit and an auxiliary circuit using the output voltage, where the output voltage is sufficient to power the LED circuit and the auxiliary circuit. In an off mode of operation, the method may include providing the feedback voltage to the voltage converter circuit at a voltage level sufficient to stop switching of the switching voltage converter circuit if the output voltage exceeds a second overvoltage less than the first overvoltage, providing the feedback voltage to the voltage converter circuit at a voltage level insufficient to stop switching of the switching voltage converter circuit if the output voltage is less than the second overvoltage, and powering an auxiliary circuit using the output voltage, where the output voltage is sufficient to power the auxiliary circuit and insufficient to power the LED circuit.

DETAILED DESCRIPTION

Figure 1A:
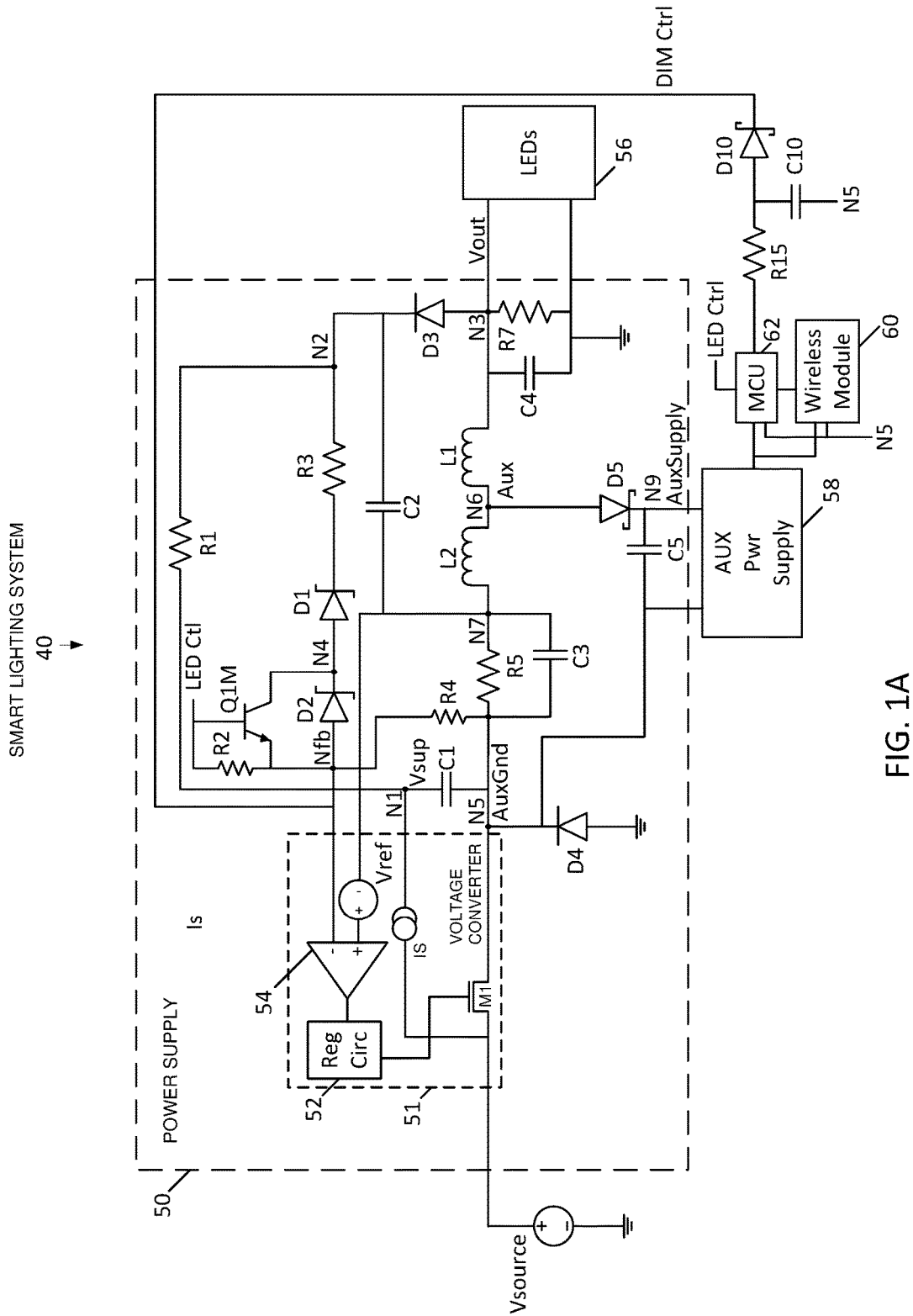
FIG. 1A is a schematic diagram of an embodiment of a smart lighting system in accordance with this disclosure.

So that the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

With initial reference to FIG. 1A, a smart lighting system 40 is now described. The smart lighting system 40 includes a power supply 50 that powers LEDs 56, as well as an auxiliary power supply 58. The LEDs 56 may be a string or array of LEDs, such as may be found in a LED light bulb. The auxiliary power supply 58 powers a microcontroller (MCU) 62 and wireless module 60 all referenced to node N5, which may, for example, be a system ground. The wireless module 60 receives user commands via a wireless protocol, such as WiFi, Z-wave, or Bluetooth, and relays said commands to the MCU 62. The MCU 62 in turn, through resistor R15 and Schottky diode D10, generates a dimmer control signal DIM Ctrl for the power supply 50. Filtering capacitor C10 is coupled to a node between resistor R15 and capacitor C10, with capacitor C10 being further connected to node N5. The dimmer control signal DIM Ctrl serves to adjust a duty cycle of the power supplied to the LEDs 56 via pulse width modulation, thereby affecting amount of illumination provided by the LEDs 56.

The MCU 62 also generates a LED control signal LED Ctrl for the power supply 50 that switches the power supply between an "on" mode in which sufficient power is supplied to the LEDs 56 so that the LEDs 56 generate light, and an "off" mode in which the power supplied is insufficient to cause the LEDs 56 to generate light. In both the on mode and the off mode, sufficient power continues to be supplied to the auxiliary power supply 58 such that the auxiliary power supply is able to supply the MCU 62 and wireless module 60.

The power supply 50 includes a voltage converter 51. The voltage converter 51 includes a power MOS M1 that has its drain coupled to a source voltage Vsource, and its source coupled to node N5. A current source Is is coupled between the drain of MOS M1 and node N1. An error amplifier 54 has its inverting terminal coupled to feedback node Nfb, and its non-inverting terminal coupled to a reference voltage Vref. This voltage source Vref is reference to node N2. Regulation circuitry 52 (e.g. PWM circuitry, etc) receives input from the output of error amplifier 54, and is coupled to the gate of MOS M1 to thereby control switching of the MOS M1. A capacitor C1, external to the power supply 50, is coupled between nodes N5 and N1.

The output of the current source Is at node N1 is coupled to node N2 through resistor R1. Node N2 is coupled to node Nfb to provide the feedback input to the voltage converter 51 through a feedback path. The feedback path is defined by resistor R3 coupled between node N2 and the cathode of zener diode D1, which in turn has its anode coupled to the cathode of zener diode D2, which itself in turn has its anode coupled to node Nfb. Bipolar transistor Q1 has its collector coupled to node N4 (to which the cathode of diode D2 and the anode of diode D1 are coupled), and its emitter coupled to node Nfb. The base of bipolar transistor Q1 is coupled to receive the LED control signal LED Ctrl from MCU 62, and is coupled to the emitter through resistor R2.

Node Nfb is coupled to node N5 through resistor R4. Current sense resistor R5 and capacitor C3 are coupled in parallel to one another between node N4 and node N7 forming a low pass filter. Capacitor C2 is coupled between node N7 and node N2. Inductor L2 is coupled between node N7 and N6, and inductor L1 is coupled between node N6 and node N3. Node N2 is coupled to node N3 through diode D3, which has its cathode coupled to node N2 and its anode coupled to node N3. Capacitor C4 and resistor R7 are coupled in parallel between node N3 and ground. The LEDs 56 are coupled between node N3 and ground as well. Resistor R2 is coupled between node N7 and node N6 as well. Schottky diode D5 is coupled between node N6 and node N9, having its cathode coupled to node N9 and its anode coupled to node N6. Capacitor C5 is coupled between node N9 and node N5. Diode D4 is coupled between node N5 and ground, with its cathode coupled to node N5 and its anode coupled to ground. The auxiliary power supply 58 is coupled between node N9 and node N5.

Node N6 provides an auxiliary voltage input Aux to the anode of Schottky diode D5. An auxiliary supply voltage AuxSupply is provided at the cathode of Schottky diode D5. The auxiliary power supply 58 is coupled between AuxSupply and an auxiliary ground voltage AuxGnd produced at node N5. Node N1 provides a supply voltage Vsup to voltage converter 51.

Although the source voltage Vsource is depicted as a voltage source, it should be appreciated that it may be any suitable circuit. In addition, although the diodes D1 and D2 are described as zener diodes, they may also be avalanche breakdown diodes in some cases.

The voltage converter 51 may be a VIPer0P voltage regulator chip, as produced and sold by STMicroelectronics, the Assignee of this Application. Further details of this VIPer0P voltage regulator chip may be found in the production data datasheet, Zero-power off-line high voltage converter, DocID028423, April 2016, readily available on the STMicroelectronics website. This production data datasheet to the VIPer0P voltage regulator chip is hereby incorporated by reference in its full 36 page entirety.

Operation of the smart lighting system 40 is now described. In the normal or "on" mode of operation, in which the LED control signal LED Ctrl keeps the transistor Q1 switched off, the voltage converter 51 participates in converting the voltage Vsource, in a range of 180-265 V (rectified from a mains voltage) to an output voltage Vout. This output voltage Vout is used for supplying the LEDs 56, such as at a voltage of 62.4 V. The collective breakdown voltage of the feedback path (comprised of the zener diode D1 and zener diode D2, in series) is greater than the supply voltage Vout used to supply the LEDs 56, such as 66 V. Therefore, the zener diodes D1 and D2 do not enter into their breakdown region, and do not flow a reverse current, during the normal mode of operation unless a higher voltage transient occurs. Current sense resistor R5 and capacitor C3 provide a current sense voltage proportional to the current through inductor L2. The current sense voltage is AC coupled to node N2. The collective forward bias voltage of the feedback path (comprised of zener diode D1 and zener diode D2 in series) is greater than the current sense voltage AC coupled to node N2. Thus, the feedback signal provided at the feedback node Mb is controlled by the dimming control signal DIM Ctrl, as well as the current flowing into node Mb through resistor R4. These operate to cause the error amplifier 54 to generate a control signal for the regulation circuitry 52 to cause it to switch the MOS M1 suitably so as to produce the desired level of dimming via pulse width modulation.

Notably, the auxiliary voltage Aux is produced at node N6 by the current flowing through inductor L2 from node N5. The auxiliary power supply 58, MCU 62, wireless module 60 are referenced to voltage AuxGnd at node N5.

When a signal is received via the wireless module 60 indicating that the LEDs 56 are to be turned off, the MCU 62 generates the LED control signal LED Ctrl such to switch on transistor Q1. Switching on transistor Q1 results in zener diode D2 being shorted, and thus, the collective breakdown voltage of the feedback path is that is zener diode D1, which is 39 V. Since the output voltage Vout is greater than this breakdown voltage, zener diode D1 will enter into a reverse conduction mode (likely in the avalanche breakdown region). Thus, here, the feedback path will be controlled by the current through zener D1, causing the error amplifier 54 to generate a control signal to the control regulation circuitry 52 to cause it to switch the MOS M1 suitably so as to reduce Vout below 39 V. Stated another way, this causes the error amplifier 54 to generate a control signal to the control regulation circuitry 52 to cause it to switch the MOS M1 to produce a Vout below the breakdown voltage of the feedback path in the "off" mode, which is less than the required voltage to cause the LEDs 56 to emit light. Thus, in the "off" mode, insufficient power will be supplied to the LEDs 56 to cause them to emit light. However, the produced Vsup is still sufficient to produce an auxiliary voltage Aux suitable for powering the auxiliary power supply 58.

Thus, the power source 50 provides for a buck power source that, in the "off" mode, switches the LEDs 56 off, yet still generates sufficient power for the auxiliary power supply 58 to run the wireless module 60, and MCU 62.

Figure 1B:
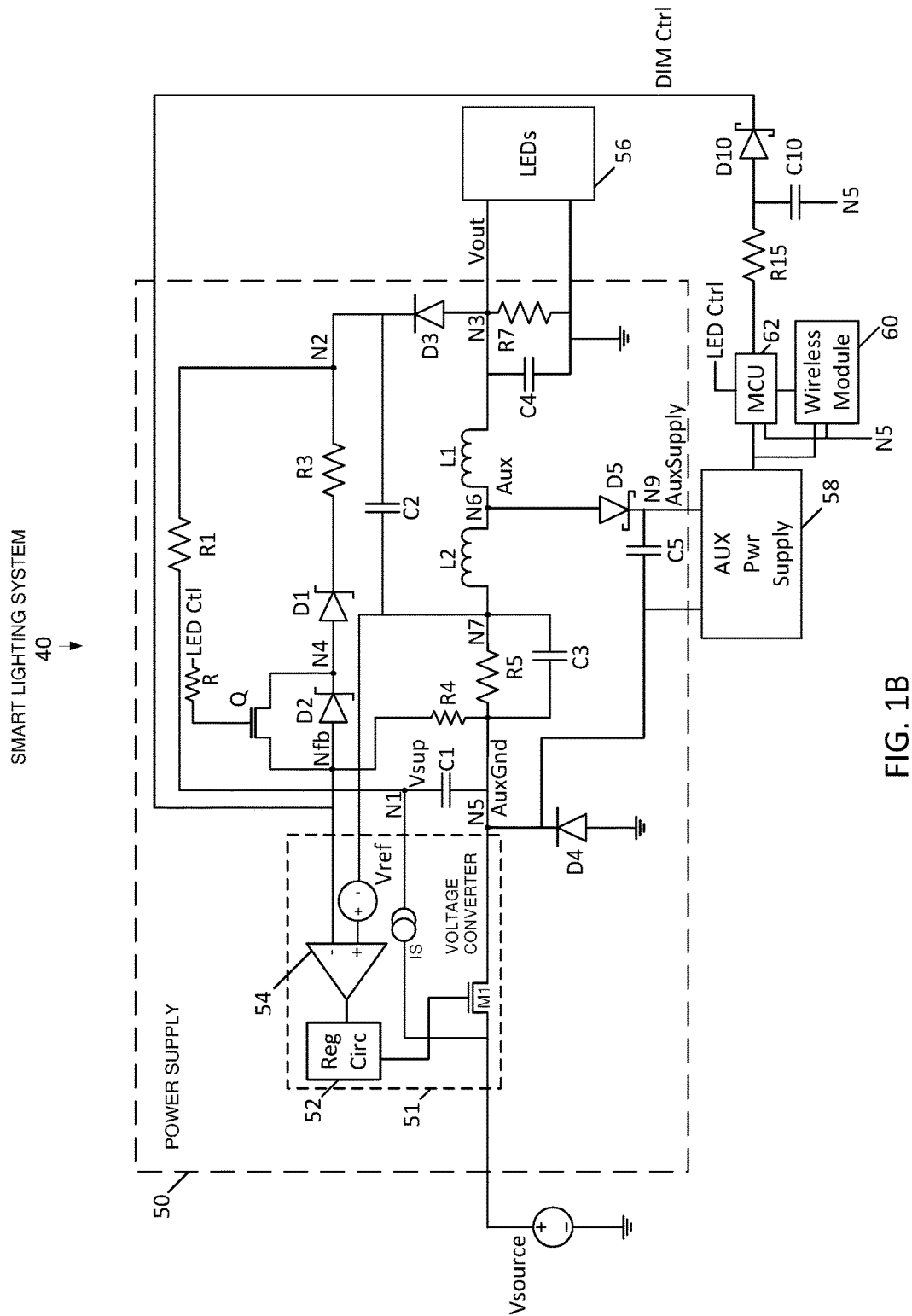
FIG. 1B is a schematic diagram of an embodiment of a smart lighting system in accordance with FIG. 1A in which the bipolar transistor is switched for a MOSFET.

As shown in FIG. 1B, instead of using a bipolar transistor Q1 (FIG. 1A), a MOSFET M may be used, having its drain coupled to node N4, its source coupled to node Nfb, and its gate coupled to receive LED Ctrl.

Figure 2A:
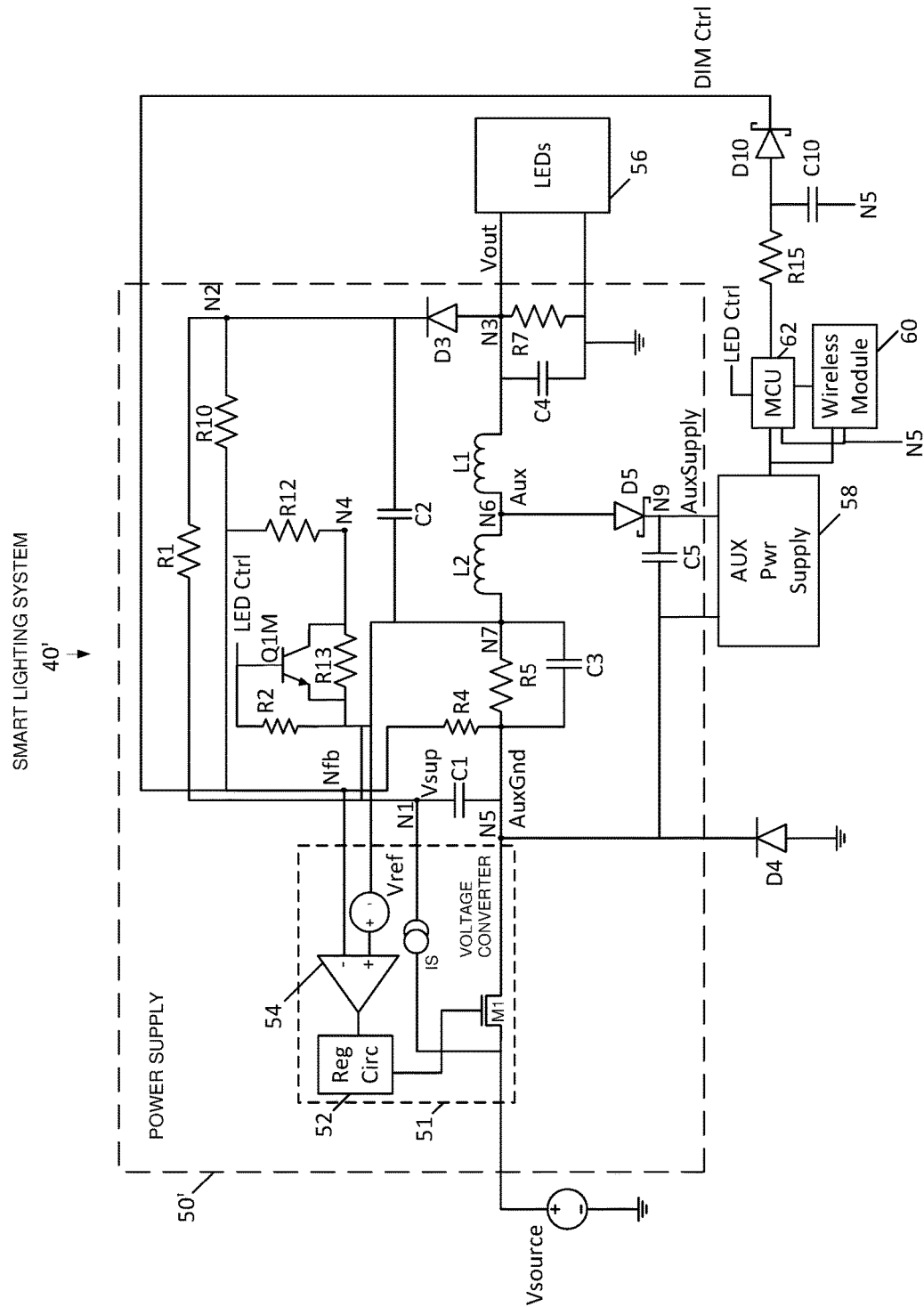
FIG. 2A is a schematic diagram of another embodiment of a smart lighting system in accordance with this disclosure.

With reference now to FIG. 2A, another embodiment of the smart lighting system 40' is now described. In this embodiment, the feedback path is comprised of resistor R13 coupled between node N1 and node N4, resistor R12 coupled between node N4 and node Nfb, and resistor R10 coupled between node Nfb and node N2. Otherwise, the smart lighting system 40' is similar to the smart lighting system 40 shown in FIG. 1, and further details of its connections need not be described herein.

Operation of the smart lighting system 40' is now described. In the "on" mode of operation, in which the LED control signal LED Ctrl keeps the transistor Q1 switched on, the voltage converter 51 converts the voltage Vsource, in a range of 180-265 V (rectified from a mains voltage) to a supply voltage Vsup at node N1. This supply voltage Vsup is coupled to node N2 through resistor R1, and is used for supplying the LEDs 56, such as at a voltage of 62.4 V.

Here, the feedback path is comprised of resistors R10, R12, and R13, for example having respective values of 220 KΩ, 4.2 KΩ, and 1 KΩ. The feedback signal provided at the feedback node Nfb is controlled by the dimming control signal DIM Ctrl, as well as the current flowing into node Mb through resistor R4. These operate to cause the error amplifier 54 to generate a control signal for the regulation circuitry 52 to cause it to switch the MOS M1 suitably so as to produce the desired level of dimming via pulse width modulation.

When a signal is received via the wireless module 60 indicating that the LEDs 56 are to be turned off, the MCU 62 generates the LED control signal LED Ctrl such to switch off transistor Q1. Switching off transistor Q1 results in resistor R13 not being shorted, and thus, the collective resistance of the feedback path is altered such that here the feedback path will be controlled by the current through resistor R2, causing the error amplifier 54 to generate a control signal to the control regulation circuitry 52 to cause it to switch the MOS M1 suitably so as to reduce Vsup below 39 V. Stated another way, this causes the error amplifier 54 to generate a control signal to the control regulation circuitry 52 to cause it to switch the MOS M1 to produce a Vsup below the required voltage to cause the LEDs 56 to emit light. Thus, in the "off" mode, insufficient power will be supplied to the LEDs 56 to cause them to emit light. However, the produced Vsup is still sufficient to produce an auxiliary voltage Aux suitable for powering the auxiliary power supply 58.

Thus, the power source 50 provides for a buck power source that, in the "off" mode, switches the LEDs 56 off, yet still generates sufficient power for the auxiliary power supply 58 to run the wireless module 60, and MCU 62.

Figure 2B:
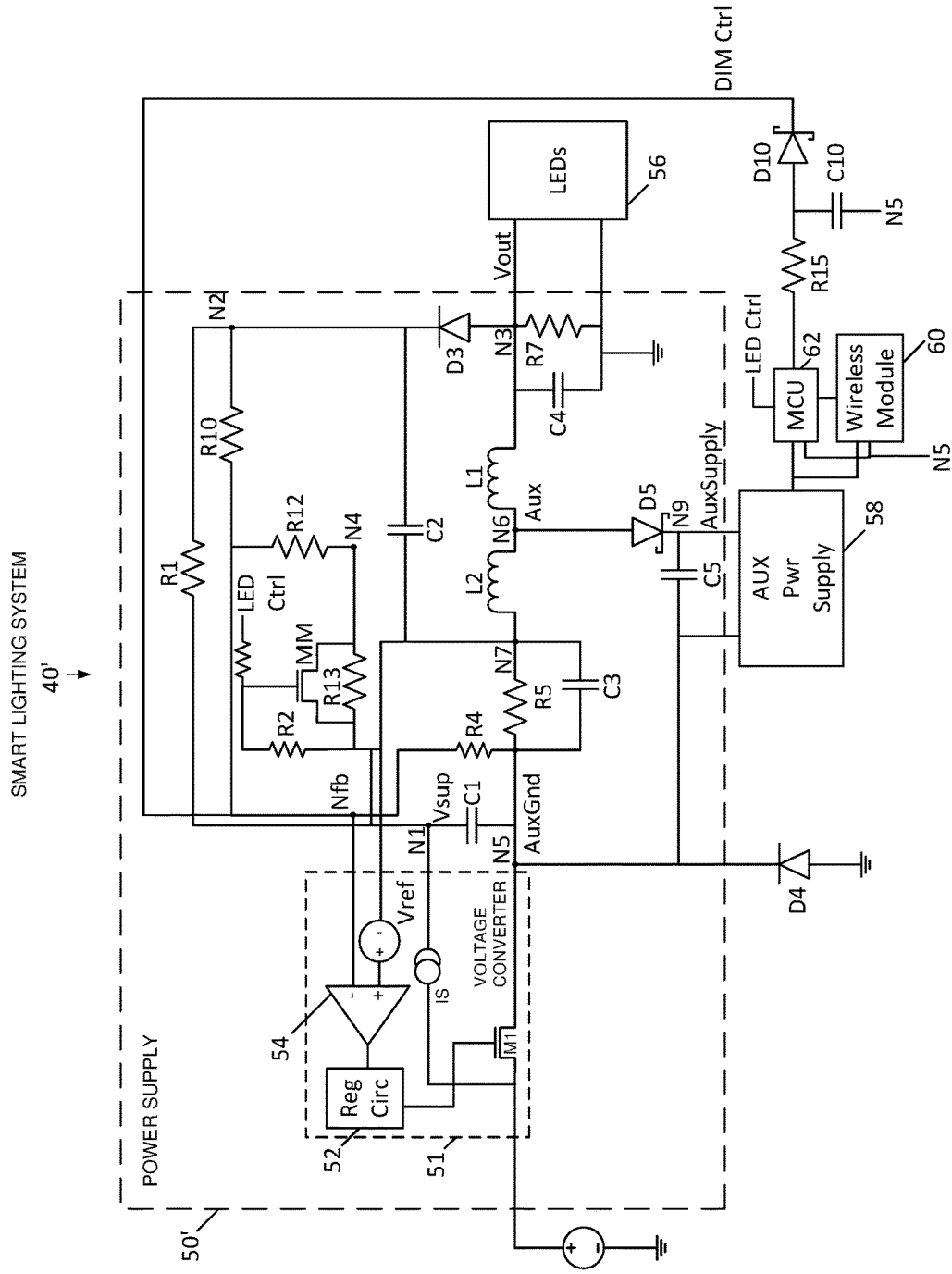
FIG. 2B is a schematic diagram of another embodiment of a smart lighting system in accordance with FIG. 2A in which the bipolar transistor is switched for a MOSFET.

As shown in FIG. 2B, instead of using a bipolar transistor Q1 (FIG. 2A), a MOSFET M may be used, having its drain coupled to node N4, its source coupled to node N1, and its gate coupled to receive LED Ctrl.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A circuit, comprising:
  a voltage converter configured to convert a source voltage to a supply voltage at a first node as a function of a feedback voltage at a feedback node;
  a first output path coupled between the first node and a second node; and
  feedback circuitry configured:
    when the circuit is in a first mode of operation, to couple the second node to the feedback node if a voltage at the second node exceeds a first overvoltage; and
    when the circuit is in a second mode of operation, to couple the second node to the feedback node if the voltage at the second node exceeds a second overvoltage less than the first overvoltage; and
  impedance circuitry coupled between the first node and a third node and configured to generate an auxiliary supply voltage and an auxiliary ground voltage when the circuit is in both the first and second modes of operation, the auxiliary supply voltage being less than the supply voltage in both the first and second modes of operation.

2. The circuit of claim 1, wherein the feedback circuitry comprises:
  a first zener diode coupled between the second node and a fourth node;
  a second zener diode coupled between the fourth node and the feedback node; and
  a switching element configured to short the second zener diode when the circuit is in the second mode of operation, and to not short the second zener diode when the circuit is in the first mode of operation.

3. The circuit of claim 2, wherein the switching element comprises a transistor having a first conduction terminal coupled to the feedback node, a second conduction terminal coupled to the fourth node, and a control terminal biased by a mode signal that serves to turn on the transistor when the circuit is in the second mode of operation and to turn off the transistor when the circuit is in the first mode of operation.

4. The circuit of claim 2, wherein the switching element comprises a bipolar junction transistor having an emitter coupled to the feedback node, a collector coupled to the fourth node, and a base biased by a mode signal that serves to turn on the bipolar junction transistor when the circuit is in the second mode of operation and to turn off the bipolar junction transistor when the circuit is in the first mode of operation.

5. The circuit of claim 2, wherein the switching element comprises a field effect transistor (FET) having an source coupled to the feedback node, a drain coupled to the fourth node, and a gate biased by a mode signal that serves to turn on the FET when the circuit is in the second mode of operation and to turn off the FET when the circuit is in the first mode of operation.

6. The circuit of claim 1, wherein the impedance circuitry comprises:
  a second output path coupled between the second node and the third node;
  a first inductor coupled between the third node and an auxiliary supply node at which the auxiliary supply voltage is generated;
  a second inductor coupled between the auxiliary supply node and an auxiliary ground node at which the auxiliary ground voltage is generated; and
  a filter coupled between the auxiliary supply node and the feedback node.

7. The circuit of claim 6, wherein the second output path comprises a diode having a cathode coupled to the second node and an anode coupled to a fourth node.

8. The circuit of claim 6, wherein the filter comprises:
  a first resistor and a first capacitor coupled in series between the auxiliary supply node and the auxiliary ground node; and
  a second resistor coupled between the auxiliary ground node and the feedback node.

9. The circuit of claim 8, further comprising a second capacitor coupled between the auxiliary ground node and the first node.

10. The circuit of claim 1, wherein the first output path comprises a second resistor.

11. The circuit of claim 1, wherein the voltage converter comprises:

an error amplifier having inputs coupled to the impedance circuitry and the feedback node, and generating a control signal based thereupon;
regulation circuitry configured to generate a switching signal as a function of the control signal from the error amplifier; and
a power transistor having a first conduction terminal coupled to the source voltage, a second conduction terminal coupled to the first node, and a control terminal biased by the switching signal.

12. The circuit of claim 11, wherein coupling of the second node to the feedback node results in the error amplifier generating the control signal so as to cause the regulation circuitry to generate the switching signal for switching the power transistor off, therefore when the circuit is in the first mode of operation, the coupling of the second node to the feedback node by the feedback circuitry when the voltage at the second node exceeds the first overvoltage results in the supply voltage being higher than it would be in the second mode of operation where the feedback circuitry couples the second node to the feedback node when the voltage at the second node exceeds the second overvoltage which is less than the first overvoltage.

13. The circuit of claim 12, further comprising a light emitting diode (LED) chain coupled to the third node, being turned on by the supply voltage when the circuit is in the first mode of operation, and not being turned on by the supply voltage when the circuit is in the second mode of operation.

14. The circuit of claim 13, further comprising:
an auxiliary power supply coupled to the auxiliary supply voltage and auxiliary ground voltage;
a microcontroller powered by the auxiliary power supply and configured to generate a LED dimmer control signal to be coupled to the feedback node; and
a wireless module powered by the auxiliary power supply and configured to relay user commands to the microcontroller.

15. The circuit of claim 1, wherein the feedback circuitry comprises:
a first resistor coupled between the second node and the feedback node;
a second resistor coupled between the feedback node and a fourth node;
a third resistor coupled between the fourth node and the first node; and
a switching element configured to not short the third resistor when the circuit is in the second mode of operation, and to short the third resistor when the circuit is in the first mode of operation.

16. The circuit of claim 15, wherein the switching element comprises a transistor having a first conduction terminal coupled to the first node, a second conduction terminal coupled to the fourth node, and a control terminal biased by a mode signal that serves to turn off the transistor when the circuit is in the second mode of operation and to turn on the transistor when the circuit is in the first mode of operation.

17. The circuit of claim 15, wherein the switching element comprises a bipolar junction transistor having an emitter coupled to the first node, a collector coupled to the fourth node, and a base biased by a mode signal that serves to turn off the bipolar junction transistor when the circuit is in the second mode of operation and to turn on the bipolar junction transistor when the circuit is in the first mode of operation.

18. The circuit of claim 1, wherein the first output path comprises a first resistor.

19. A method, comprising:
converting an input voltage to an output voltage using a switching voltage converter circuit, in response to a feedback voltage;
in a normal mode of operation,
providing the feedback voltage to the switching voltage converter circuit at a voltage level sufficient to stop switching of the switching voltage converter circuit if the output voltage exceeds a first overvoltage;
providing the feedback voltage to the switching voltage converter circuit at a voltage level insufficient to stop switching of the switching voltage converter circuit if the output voltage is less than the first overvoltage; and
powering a LED circuit and an auxiliary circuit using the output voltage, wherein the output voltage is sufficient to power the LED circuit and the auxiliary circuit;
in an off mode of operation,
providing the feedback voltage to the switching voltage converter circuit at a voltage level sufficient to stop switching of the switching voltage converter circuit if the output voltage exceeds a second overvoltage less than the first overvoltage;
providing the feedback voltage to the switching voltage converter circuit at a voltage level insufficient to stop switching of the switching voltage converter circuit if the output voltage is less than the second overvoltage; and
powering an auxiliary circuit using the output voltage, wherein the output voltage is sufficient to power the auxiliary circuit and insufficient to power the LED circuit.

20. The method of claim 19, wherein providing the feedback voltage to the switching voltage converter circuit comprises coupling the output voltage to the switching voltage converter circuit as the feedback voltage using a plurality of reverse biased zener diodes coupled in series, wherein the first overvoltage is a breakdown voltage of the plurality of reverse biased zener diodes coupled in series, and wherein the second overvoltage is a breakdown voltage of a subset of the plurality of reverse biased zener diodes coupled in series.

21. The method of claim 20, further comprising shorting those of the plurality of reverse biased zener diodes coupled in series that are not members of the subset, when in the off mode of operation; and further comprising not shorting those of the plurality of reverse biased zener diodes coupled in series that are not members of the subset, when in the normal mode of operation.

22. A circuit, comprising:
a voltage converter configured to convert a source voltage to a supply voltage at a first node as a function of a feedback voltage at a feedback node;
a first output path coupled between the first node and a second node;
feedback circuitry configured, when the circuit is in a first mode of operation, to couple the second node to the feedback node if a voltage at the second node exceeds an overvoltage;
impedance circuitry coupled between the first node and a third node and configured to generate an auxiliary supply voltage and an auxiliary ground voltage, the auxiliary supply voltage being less than the supply voltage;
a light emitting diode (LED) chain coupled to the third node, being turned on by the supply voltage when the circuit is in a second mode of operation, and not being turned on by the supply voltage when the circuit is in the first mode of operation;
an auxiliary power supply coupled to the auxiliary supply voltage and the auxiliary ground voltage;
a microcontroller powered by the auxiliary power supply and configured to generate a LED dimmer control signal to be coupled to the feedback node; and
a wireless module powered by the auxiliary power supply and configured to relay user commands to the microcontroller.

23. The circuit of claim 22, wherein the voltage converter comprises:
an error amplifier having inputs coupled to the impedance circuitry and the feedback node, and generating a control signal based thereupon;
regulation circuitry configured to generate a switching signal as a function of the control signal from the error amplifier; and
a power transistor having a first conduction terminal coupled to the source voltage, a second conduction terminal coupled to the first node, and a control terminal biased by the switching signal.

24. The circuit of claim 23, wherein coupling of the second node to the feedback node results in the error amplifier generating the control signal so as to cause the regulation circuitry to generate the switching signal for switching the power transistor off.

25. The circuit of claim 22, wherein the feedback circuitry comprises:
a first resistor coupled between the second node and the feedback node;
a second resistor coupled between the feedback node and a fourth node;
a third resistor coupled between the fourth node and the first node; and
a switching element configured to short the third resistor when the circuit is in the first mode of operation.

26. The circuit of claim 25, wherein the switching element comprises a transistor having a first conduction terminal coupled to the first node, a second conduction terminal coupled to the fourth node, and a control terminal biased by a mode signal that serves to turn on the transistor when the circuit is in the first mode of operation.

27. The circuit of claim 25, wherein the switching element comprises a bipolar junction transistor having an emitter coupled to the first node, a collector coupled to the fourth node, and a base biased by a mode signal that serves to turn on the bipolar junction transistor when the circuit is in the first mode of operation.

28. A method, comprising:
converting an input voltage to an output voltage using a switching voltage converter circuit, in response to a feedback voltage; and
in an off mode of operation,
providing the feedback voltage to the switching voltage converter circuit at a voltage level sufficient to stop switching of the switching voltage converter circuit if the output voltage exceeds an overvoltage;
providing the feedback voltage to the switching voltage converter circuit at a voltage level insufficient to stop switching of the switching voltage converter circuit if the output voltage is less than the overvoltage; and
powering an auxiliary circuit using the output voltage, wherein the output voltage is sufficient to power the auxiliary circuit and insufficient to power an LED circuit.

29. The method of claim 28, wherein providing the feedback voltage to the switching voltage converter circuit comprises coupling the output voltage to the switching voltage converter circuit as the feedback voltage using a plurality of reverse biased zener diodes coupled in series, wherein the overvoltage is a breakdown voltage of a subset of the plurality of reverse biased zener diodes coupled in series.

30. The method of claim 29, further comprising shorting those of the plurality of reverse biased zener diodes coupled in series that are not members of the subset, when in the off mode of operation.

* * * * *

UNITED STATES PATENT AND TRADEMARK OFFICE
CERTIFICATE OF CORRECTION

PATENT NO. : 10,405,384 B2
APPLICATION NO. : 16/106593
DATED : September 3, 2019
INVENTOR(S) : Akshat Jain et al.

Page 1 of 1

It is certified that error appears in the above-identified patent and that said Letters Patent is hereby corrected as shown below:

In the Specification

At Column 6, Line 17, please replace the term [[ Mb ]] with the term -- $N_{fb}$ --.

At Column 6, Line 19, please replace the term [[ Mb ]] with the term -- $N_{fb}$ --.

At Column 7, Line 13, please replace the term [[ Mb ]] with the term -- $N_{fb}$ --.

Signed and Sealed this
Sixteenth Day of June, 2020

Andrei Iancu
*Director of the United States Patent and Trademark Office*